(12) United States Patent
Baik et al.

(10) Patent No.: US 7,826,801 B2
(45) Date of Patent: Nov. 2, 2010

(54) ADAPTIVE FORWARD ERROR CORRECTOR AND METHOD THEREOF, AND TDD RADIO REPEATING APPARATUS USING THE SAME

(75) Inventors: Sung-Jun Baik, Daegu (KR); Byung-Soo Chang, Gyeonggi-do (KR); Seong-Choon Lee, Seoul (KR); Kyoo-Tae Ryoo, Gyeonggi-do (KR); Jeong-Hwi Kim, Seoul (KR); Jong-Sik Lee, Seoul (KR)

(73) Assignees: Airpoint (KR); KT Corporation (KR)

( * ) Notice: Subject to any disclaimer, the term of this patent is extended or adjusted under 35 U.S.C. 154(b) by 115 days.

(21) Appl. No.: 11/794,760

(22) PCT Filed: Mar. 7, 2007

(86) PCT No.: PCT/KR2007/001132
§ 371 (c)(1),
(2), (4) Date: Jul. 3, 2007

(87) PCT Pub. No.: WO2007/102707
PCT Pub. Date: Sep. 13, 2007

(65) Prior Publication Data
US 2009/0207776 A1 Aug. 20, 2009

(30) Foreign Application Priority Data
Mar. 7, 2006 (KR) ............... 10-2006-0021477

(51) Int. Cl.
*H04B 1/00* (2006.01)
(52) U.S. Cl. ............... 455/69; 455/24; 455/126; 330/149; 330/136; 330/85; 330/107; 330/129; 375/222; 379/406.06; 381/71.11; 381/71.12; 381/71.1; 381/71.5; 708/323; 714/704; 370/315

(58) Field of Classification Search ............... 455/69, 455/126, 24; 330/149, 136, 85, 107, 109, 330/129; 375/222; 379/406.06; 381/71.11, 381/71.12, 71.1, 71.5; 708/323; 714/704; 370/315
See application file for complete search history.

(56) References Cited

U.S. PATENT DOCUMENTS 5,396,189 A * 3/1995 Hays ............... 330/149

(Continued)

FOREIGN PATENT DOCUMENTS

JP 62-003525 1/1988

(Continued)

*Primary Examiner*—Matthew D Anderson
*Assistant Examiner*—April G Gonzales
(74) *Attorney, Agent, or Firm*—Blakely, Sokoloff, Taylor & Zafman

(57) ABSTRACT

An adaptive feedback estimation and cancellation (AFEC) apparatus includes: a controller for generating and outputting control information by using a synchronization signal from an external synchronization acquisition unit and base station information, in order to remove a feedback signal that exists in a forward/reverse repeater signal to be repeated and then send the forward/reverse repeater signal; a first feedback prediction canceller for adaptively removing a feedback signal that exists in the forward repeater signal based on the control information from the controller and automatically adjusting the gain of the forward repeater signal; and a second feedback prediction canceller for adaptively removing a feedback signal that exists in the reverse repeater signal based on the control information from the controller and automatically controlling the gain of the reverse repeater signal.

19 Claims, 7 Drawing Sheets

U.S. PATENT DOCUMENTS

| | | |
|---|---|---|
| 5,991,418 A | 11/1999 | Kuo |
| 6,418,227 B1 * | 7/2002 | Kuo ........................ 381/71.11 |
| 6,505,222 B1 * | 1/2003 | Davis et al. ................. 708/323 |
| 6,553,518 B1 * | 4/2003 | Ware et al. .................. 714/704 |
| 6,792,040 B1 * | 9/2004 | Davis et al. ................. 375/222 |
| 7,031,460 B1 * | 4/2006 | Zheng et al. ........... 379/406.06 |
| 7,343,016 B2 * | 3/2008 | Kim ........................ 381/71.12 |
| 2006/0040611 A1 | 2/2006 | Ding et al. |

FOREIGN PATENT DOCUMENTS

| | | |
|---|---|---|
| JP | 2001-077739 A | 3/2001 |
| JP | 2004-179801 | 6/2004 |
| KR | 10-2003-0067330 A | 8/2003 |
| KR | 1020040063258 | 7/2004 |
| KR | 10-2004-0102635 | 12/2004 |
| RU | 2037966 C1 | 6/1995 |
| WO | WO 94/08418 | 4/1994 |
| WO | WO 99/30422 | 6/1999 |
| WO | WO 01/61885 A1 | 8/2001 |

* cited by examiner

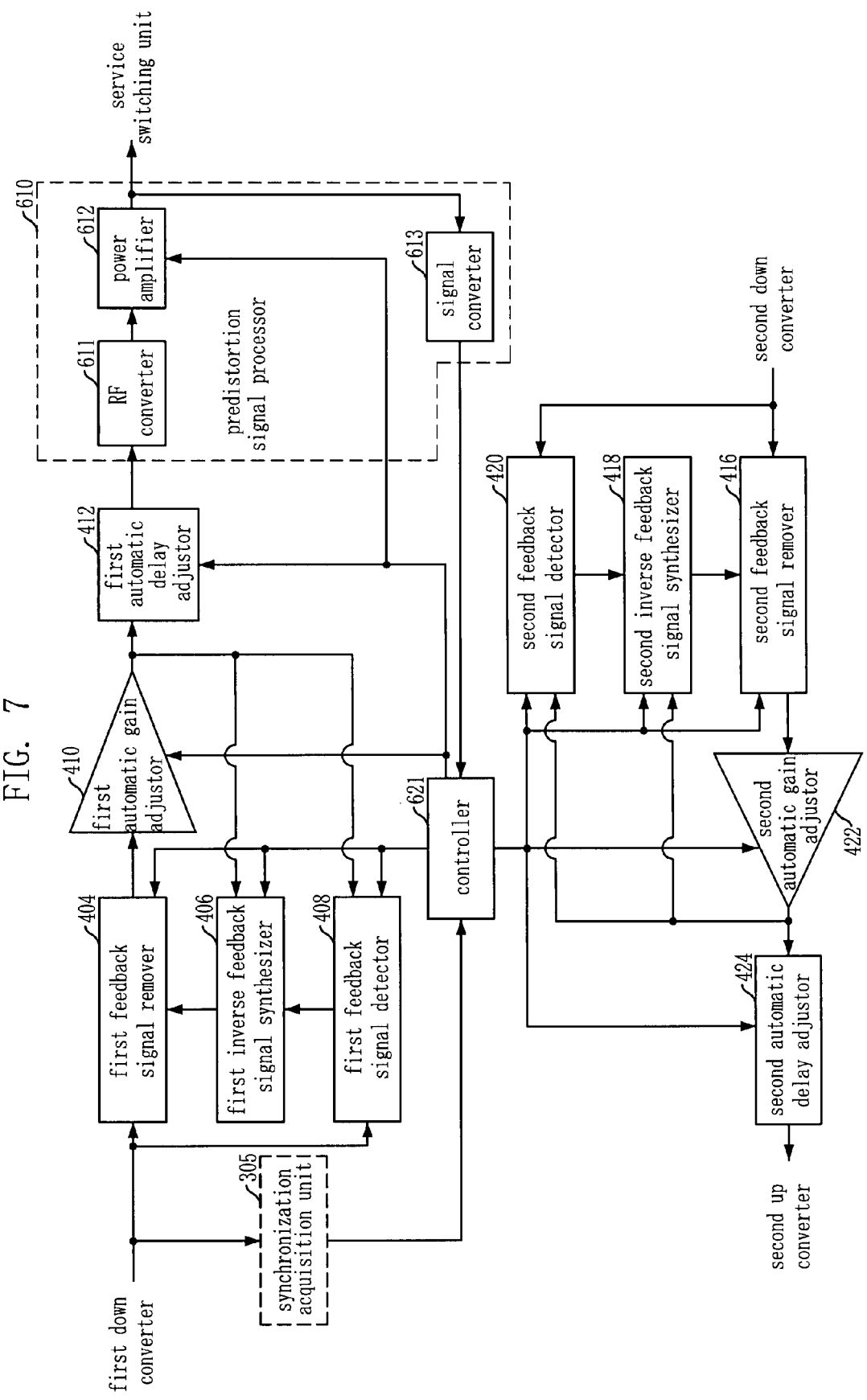

ADAPTIVE FORWARD ERROR CORRECTOR AND METHOD THEREOF, AND TDD RADIO REPEATING APPARATUS USING THE SAME

This is a non-provisional application claiming the benefit of International application number PCT/KR2007/001132 filed Mar. 7, 2007.

TECHNICAL FIELD

The present invention relates to an adaptive feedback estimation and cancellation (AFEC) apparatus and method thereof, and a time division duplex (TDD) radio repeater apparatus using the same and a computer-readable storage medium storing a program of implementing the method. More particularly, the invention relates to an AFEC apparatus and its method, and a TDD repeater apparatus using the same and a computer-readable storage medium storing a program of implementing the method, which are capable of improving the stability of a signal repeater by operating adaptively to a change of radio channel environments using a synchronization signal and improving the quality of services by completely removing a feedback signal component from a target repeater signal.

BACKGROUND ART

In the following description, it is first defined that the term "forward" refers to a signal transfer direction from a base station to a terminal and the term "reverse" refers to a signal transfer direction from a terminal to a base station.

A TDD radio repeater apparatus serves to extend a radio transmission/reception section of a base station, and is equipment to be capable of very effectively providing mobile communication services at inexpensive cost in radio wave shadowing areas such as the inside of building, underground and the like. Therefore, this TDD radio repeater apparatus has been frequently used for increase of subscriber capacity and for services of specific areas.

Further, the TDD radio repeater apparatus is a device which periodically performs ON/OFF operations of a signal transfer from a base station to a terminal (forward) and of a signal transfer from a terminal a to a base station (reverse) at regular time intervals using a same transmission/reception frequency. That is, the TDD radio repeater apparatus carries out an operation in which a down link that receives a radio wave from a base station and radiates it to a service area and an up link that receives a radio wave from a service area (terminal) and transmits it to a base station are alternatively ON/OFF. The ON/OFF operations are made by the control of a synchronization acquisition unit so that a signal is transferred from a base station to a terminal or from a terminal to a base station by a switching unit which is arranged at each of donor and service antenna ends.

At this time, since a TDD method is used for the purpose, there is a need for the process of synchronization acquisition for the down link from the base station to the terminal in order to synchronize the ON/OFF operation timings of the up link and the down link. This synchronization acquisition process is normally made by using a preamble of the down link. Since the preamble is structured to effectively establish the synchronization acquisition in the TDD method and has a base station' identification (ID) and segment information, it can be obtained through the signal processing process of the synchronization acquisition unit.

FIG. 1 illustrates a block diagram of a conventional TDD radio repeater apparatus.

As shown in FIG. 1, the conventional TDD radio repeater apparatus includes a donor antenna 100 for transmitting/receiving a signal connected to a base station; a donor band pass filter 101 for band-filtering the signal transmitted/received through the donor antenna 100; a donor switching unit 102, placed between the donor band pass filter 101 and a first down converter 103 and a second up converter 112, for switching the transmitted/received signal under the control of a synchronization acquisition unit 105; the first down converter 103 for down-converting the received signal from the donor switching unit 102; a first band filter 104 for filtering the received signal down-converted by the first down converter 103; the synchronization acquisition unit 105 for accepting the received signal from the first band filter 104 to acquire a synchronization of a TDD radio repeater signal; a first up converter 106 for taking the received signal from the first band filter 104 and up-converting the down-converted repeater signal (received signal) into an original repeater signal; a service switching unit 107, disposed between each of the first up converter 106 and a second down converter 110 and a service band pass filter 108, for switching the transmitted/received signal under the control of the synchronization acquisition unit 105; the service band pass filter 108 for band-filtering a signal transmitted/received through a service antenna 109; and the service antenna 109 for transmitting/receiving a signal connected to a terminal of a service area. Here, a reverse operation (transmission of a signal from the terminal to the base station) is similar to the above-mentioned forward operation and thus will easily be understood by a person skilled in the art with reference to the above description and FIG. 1. Therefore, details thereof are omitted here.

In the conventional TDD radio repeater apparatus, in case where the power of signal outputted from the donor antenna 100 is strong, an output signal is feedbacked to the service antenna 109 and again amplified and radiated through the donor antenna 100 and oscillated. This case is also applied to the inverse process. To minimize this oscillation phenomenon, the donor antenna 100 and the service antenna 109 are installed at far distance so that the degree of isolation between the two antennas is larger than a given gain. Like this, in case where the two antennas are arranged at far distance, there exists a problem that the installation cost is increased. Further, in order to fully reduce the feedback phenomenon (oscillation problem) of a transmitted signal, it is followed by the design constraint that the gain of the radio repeater apparatus should be lowered.

To solve the above problem, there has been proposed a radio repeater apparatus as shown in FIG. 2.

FIG. 2 illustrates another example of a conventional radio repeater apparatus, especially a structure of a down link.

In the radio repeater apparatus shown in FIG. 2, since the synchronization acquisition procedure is the same as that described in FIG. 1 and the up link and the down link are identical in structure to each other, only the down link will be described, without the switching unit.

A difference between the radio repeater apparatus shown in FIG. 2 and the TDD radio repeater apparatus in FIG. 1 is that the former apparatus has the function of preventing the oscillation problem, without decreasing the amplification gain of the radio repeater apparatus, by estimating a phase and magnitude of a signal feedbacked to a receiving antenna by using a specific tone and removing the feedback signal from a received signal through the receiving antenna based on the estimated phase and magnitude of the signal.

The radio repeater apparatus of FIG. 2 performs an initial operation function which estimates a phase and magnitude for a specific tone and decides a reverse phase to remove a feedback signal based on the estimated phase and magnitude, and a normal operation function which removes and radiates the feedback signal from an actual repeater signal according to the reverse phase decided in the initial operation state.

First, a microprocessor 230 waits for a synchronization signal for a down link from a synchronization acquisition unit 231 in the initial operation state. In the TDD radio repeater apparatus, it is required that the synchronization acquisition with a base station be preceded, and when the synchronization acquisition is made, the microprocessor 230 generates a specific tone based on a synchronization signal through a transmitting end tone generator 220. Then, the generated specific tone is filtered by a transmitting end band pass filter 222 and then radiated to a service area through a transmitting end antenna.

Next, when a transmitted signal is induced (feedbacked) to and received by the receiving end antenna, it is filtered by a receiving end band pass filter 200, amplified by a receiving end amplifier 201, and then inputted to a phase synthesizer 211 which is an original signal path. At this time, a variation of each of the phase and magnitude of the specific tone is detected by a receiving end tone phase/magnitude detector 202 which is arranged at the front end of the phase synthesizer 211. The values so detected are then to a phase/magnitude comparator 210. Then, the phase/magnitude comparator 210 compares the output values of the receiving end tone phase/magnitude detector 202 with a phase and magnitude of a specific tone obtained from a transmitting end tone phase/magnitude detector 223 which is disposed at a next stage of the transmitting end band pass filter 222, and provides the comparison result to the microprocessor 230.

Then, the microprocessor 230 transmits a reverse phase value for the specific tone, which is obtained by using the magnitude and phase variations for the specific tone, to the transmitting end tone generator 220 and the reverse phase synthesizer 212. According to this, the reverse phase synthesizer 212 generates a specific tone with the reverse phase by using the reverse phase value from the microprocessor 230 and the specific tone internally feedbacked through a gain attenuation/feedback path part 213 and a distributor 214, and transfers it to the phase synthesizer 211 to remove the specific tone from the received signal.

By the above operation, when the specific tone (feedback signal) is removed from the received signal, a receiving end tone detector 215 measures a magnitude of the specific tone, and if the measured magnitude becomes less than a preset magnitude, notifies the microprocessor 230 of this and the initial state operation is finished.

Thereafter, in the normal operation state, the radio repeater apparatus receives and amplifies a radio wave from the base station and then radiates it to the service area. Then, it interrupts the operations of the transmitting end tone generator 220, the receiving end tone phase/magnitude detector 202 and the phase/magnitude comparator 210, and operates the reverse phase synthesizer 212 and the phase synthesizer 211, to thereby remove the feedback signal by using the phase and magnitude for the specific tone which is obtained in the initial operation state. At this time, the received signal that passes through the phase synthesizer 211, which the feedback signal is removed, is amplified by the transmitting end amplifier 221, filtered by the transmitting end band pass filter 222, and radiated through the transmitting antenna.

Further, the receiving end tone detector 215 watches an output of the received signal that continuously passes through the phase synthesizer 211, which the feedback signal is removed, judges it to be oscillation if the output of the received signal is detected to be greater than a given level, and provides the judgment result to the microprocessor 230. Then, the microprocessor 230 blocks the RF switching unit 216 to block the connection passageway of the phase synthesizer 211 and the transmitting end amplifier 221, thereby making the initial state operation performed again.

The radio repeater apparatus as shown in FIG. 2 removes the feedback signal by finding out the phase and magnitude thereof if the signal radiated to the service area by using the specific tone is feedbacked back to the receiving antenna, to thereby prevent the oscillation of the signal. However, this radio repeater apparatus of FIG. 2 has a drawback in that it cannot repeater an actual signal during the process of detecting the phase and magnitude by using the specific tone.

Furthermore, under the radio environments, the phase and magnitude of the feedback signal are continuously varied due to change of peripheral environments, such as a case where peripheral objects are moving or buildings are under construction, and thus the optimal phase and magnitude are also varied. Therefore, it is required that the optimal phase and magnitude be continuously updated to remove the feedback signal. If it does not do so, there exists a feedback signal component even after removing the feedback signal. As a result, the radio repeater apparatus of FIG. 2 has a problem that a signal is oscillated by the residual feedback signal component.

In particular, the radio repeater apparatus of FIG. 2 carries out its operation for each of the initial operations state and the normal operation state separately. Therefore, if it fails to accurately predict the phase and magnitude in the initial operation state, the performance of the apparatus is lowered in the normal operation state, and it does not cope with abrupt external environment change. Moreover, since it is not possible to adjust the output magnitude, stability cannot be guaranteed, even in the change of the sudden radio channel environment, and the quality of output between the base station and the mobile communication terminal cannot be maintained at required levels.

DISCLOSURE

Technical Problem

An embodiment of the present invention is directed to providing an AFEC apparatus and its method, and a TDD repeater apparatus using the same and a computer-readable storage medium storing a program of implementing the method, which are capable of improving the stability of a signal repeater by operating adaptively to a change of radio channel environments using a synchronization signal and improving the quality of services by completely removing a feedback signal component from a target repeater signal.

Another embodiment of the present invention is directed to providing an AFEC apparatus and its method, and a TDD repeater apparatus using the same and a computer-readable storage medium storing a program of implementing the method, which are capable of improving the stability of a signal repeater by operating adaptively to a change of radio channel environments using a synchronization signal and improving the quality of services and preventing an interference between a feedback signal and a multipath signal within a repeater signal by completely removing a feedback signal component from a target repeater signal.

Another embodiment of the present invention is directed to providing an AFEC apparatus and its method, and a TDD repeater apparatus using the same and a computer-readable storage medium storing a program of implementing the method, which are capable of improving the stability of a signal repeater by operating adaptively to a change of radio channel environments using a synchronization signal and improving the quality of services and linearizing a non-linear characteristic of a power amplifier based on predistortion information by completely removing a feedback signal component from a target repeater signal.

The other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an adaptive feedback estimation and cancellation (AFEC) apparatus, the apparatus including: a controller for generating and outputting control information by using a synchronization signal from an external synchronization acquisition unit and base station information, in order to remove a feedback signal that exists in a forward/reverse repeater signal to be repeated and then send the forward/reverse repeater signal; a first feedback prediction canceller for adaptively removing a feedback signal that exists in the forward repeater signal based on the control information from the controller and automatically adjusting the gain of the forward repeater signal; and a second feedback prediction canceller for adaptively removing a feedback signal that exists in the reverse repeater signal based on the control information from the controller and automatically controlling the gain of the reverse repeater signal.

In accordance with another aspect of the present invention, there is provided an apparatus further including: a first automatic delay adjustor for preventing a mutual interference between the feedback signal that exists within the forward repeater signal and a multipath signal under the control of the controller; and a second automatic delay adjustor for preventing a mutual interference between the feedback signal that exists within the reverse repeater signal and the multipath signal under the control of the controller.

In accordance with another aspect of the present invention, there is provided an apparatus including the controller which further performs the function of controlling a predistortion signal process to correct the nonlinearity of an external power amplifier.

In accordance with another aspect of the present invention, there is provided a time division duplex (TDD) radio repeater apparatus including: a donor antenna for transmitting/receiving a signal (forward/reverse repeater signal) to be repeated to/from a base station; a first filtering unit for band-filtering the forward/reverse repeater signal transmitted/received via the donor antenna; a donor switching unit for switching the forward repeater signal from the first filtering unit to a first down converter or switching the reverse repeater signal from a second up converter to the first filtering unit under the control of a synchronization acquisition unit; the first down converter for down-converting the forward repeater signal switched through the donor switching unit into a base band signal; the synchronization acquisition unit for acquiring synchronization with the base station by using the forward repeater signal down-converted by the first down converter; an AFEC apparatus for removing a feedback signal from the forward repeater signal down-converted by the first down converter or from the reverse repeater signal down-converted by a second down converter and adjusting the gain of the forward/reverse repeater signal based on information from the synchronization acquisition unit; a first up converter for up-converting the forward repeater signal from the AFEC apparatus into a repeater signal of high frequency band; a service antenna for transmitting/receiving a signal (forward/reverse repeater signal) to be repeated to/from a terminal of a service area; a second filtering unit for band-filtering the forward/reverse repeater signal transmitted/received via the service antenna; a service switching unit for switching the forward repeater signal from the first up converter to the second filtering unit or switching the reverse repeater signal from the second filtering unit to the second down converter under the control of the synchronization acquisition unit; the second down converter for down-converting the reverse repeater signal switched through the service switching unit into a base band signal, and transferring the down-converted signal to the AFEC apparatus; and the second up converter for up-converting the reverse repeater signal from the AFEC apparatus into a repeater signal of high frequency band, and transferring the up-converted repeater signal to the donor switching unit.

In accordance with another aspect of the present invention, there is provided a TDD radio repeater apparatus, the apparatus including: a donor antenna for transmitting/receiving a signal (forward/reverse repeater signal) to be repeated to/from a base station; a first filtering unit for band-filtering the forward/reverse repeater signal transmitted/received via the donor antenna; a donor switching unit for switching the forward repeater signal from the first filtering unit to a first down converter or switching the reverse repeater signal from a second up converter to the first filtering unit under the control of a synchronization acquisition unit; the first down converter for down-converting the forward repeater signal switched through the donor switching unit into a base band signal; the synchronization acquisition unit for acquiring synchronization with the base station by using the forward repeater signal down-converted by the first down converter; an AFEC apparatus for removing a feedback signal from the forward repeater signal down-converted by the first down converter or the reverse repeater signal down-converted by a second down converter and adjusting the gain of the forward/reverse repeater signal based on information from the synchronization acquisition unit, and controlling a linear power amplification of the forward repeater signal by using predistortion information in linkage with a predistortion signal processor; the predistortion signal processor linked with the AFEC apparatus and linearly power-amplifying the forward repeater signal from the AFEC apparatus based on the predistortion information power; a service antenna for transmitting/receiving a signal (forward/reverse repeater signal) to be repeated to/from a terminal of a service area; a second filtering unit for band-filtering the forward/reverse repeater signal transmitted/received via the service antenna; a service switching unit for switching the forward repeater signal from the predistortion signal processor to the second filtering unit or switching the reverse repeater signal from the second filtering unit to the second down converter under the control of the synchronization acquisition unit; the second down converter for down-converting the reverse repeater signal switched through the service switching unit into a base band signal, and transferring the down-converted signal to the AFEC apparatus; and the second up converter for up-converting the reverse repeater signal from the AFEC apparatus into a repeater signal of high frequency band, and transferring the up-converted repeater signal to the donor switching unit.

In accordance with another aspect of the present invention, there is provided a TDD radio repeater apparatus having the AFEC apparatus which further performs: a first automatic delay adjusting function of preventing a mutual interference between the feedback signal existing within the forward repeater signal and a mutipath signal; and a second automatic delay adjusting function of preventing a mutual interference between the feedback signal existing within the reverse repeater signal and the mutipath signal.

In accordance with another aspect of the present invention, there is provided an AFEC method, including the steps of: detecting and updating a phase and magnitude of a feedback signal from a repeater signal to be repeated and another repeater signal that its gain is adjusted and feedbacked; creating an inverse feedback signal by using another repeater signal that its gain is adjusted and feedbacked, and the phase and magnitude of the feedback signal detected in the feedback signal detecting step; removing the feedback signal that exists in the repeater signal to be repeated based on the inverse feedback signal created in the inverse feedback signal creating step; and automatically adjusting the gain of the repeater signal that the feedback signal is removed in the feedback signal removing step.

In accordance with another aspect of the present invention, there is provided an AFEC method, further including the step of adjusting the generation time of the feedback signal to prevent the mutual interference between the feedback signal that exists within the repeater signal and a multipath signal.

In accordance with another aspect of the present invention, there is provided an AFEC method, further including the step of controlling a linear power amplification of a forward repeater signal by using predistortion information.

In accordance with another aspect of the present invention, there is provided a computer-readable storage medium storing in an AFEC apparatus having a processor a software program of realizing the functions of: detecting and updating a phase and magnitude of a feedback signal from a repeater signal to be repeated and another repeater signal that its gain is adjusted and feedbacked; creating an inverse feedback signal by using another repeater signal that its gain is adjusted and feedbacked, and the phase and magnitude of the feedback signal detected by the feedback signal detecting function; removing the feedback signal that exists in the repeater signal to be repeated based on the inverse feedback signal created by the inverse feedback signal creating function; and automatically controlling the gain of the repeater signal that the feedback signal is removed by the feedback signal removing function.

In accordance with another aspect of the present invention, there is provided a computer-readable storage medium, further including the function of adjusting the generation time of the feedback signal to prevent a mutual interference between the feedback signal that exists within the repeater signal and a multipath signal.

In accordance with another aspect of the present invention, there is provided a computer-readable storage medium, further including the function of controlling a linear power amplification of a forward repeater signal by using predistortion information.

The present invention acquires a synchronization with a base station stably by adapting an algorithm optimized to a synchronization acquiring unit, and controls an on/off switching timing for an uplink and a downlink based on a delay time generated in a signal processing process of an adaptive feedback error corrector. Moreover, the present invention maintains an output quality by controlling a generation time and efficiently removing a feedback signal so that a feedback signal is additionally not overlapped with a multipath signal. Further, the present invention can linearize a non-linearity of a power amplifier by performing a predistortion signal processing function.

Advantageous Effects

As described above and will be given below, the present invention can effectively remove a feedback signal from a repeater signal while minimizing installation costs, maintain output magnitude at required levels, and prevent an interference with a multipath signal.

In other words, the present invention can remove the feedback signal by using a transmitted/received signal made by a change of peripheral channel environments and control the magnitude of an output signal by automatically adjusting its gain, thereby reducing the installation costs and guaranteeing high output characteristics while overcoming the restriction of the output magnitude and constraint problem in its installation.

In addition, the present invention estimates radio channel environments around a repeater by using base station information found in the process of synchronization acquisition and then delays an input time of the feedback signal unless the feedback signal and the multipath signal are received at the same time, thereby effectively removing the feedback signal by distinguishing from each other.

Moreover, the TDD radio repeater apparatus of the invention employs a same transmission/reception frequency and thus finds out radio channel environments through a down link so that it can also be applied to an up link. Therefore, the present invention does not need to interrupt the radio repeater service in order to remove the feedback signal, and can provide a continuous service while updating channel estimated values adaptively in response to a change of peripheral environments, even during the provision of service.

Like this, the present invention can prevent oscillation phenomenon adaptively to a change of peripheral environments to improve stability and maintain the quality of service at required levels by constantly keeping the magnitude of the output signal, and can be applied to a variety of mobile communication systems.

BRIEF DESCRIPTION OF THE DRAWINGS

FIG. 7 is a detailed diagram of one example of the AFEC apparatus and the predistortion signal processor shown in FIG. 6.

BEST MODE FOR THE INVENTION

The advantages, features and aspects of the invention will become apparent from the following description of the embodiments with reference to the accompanying drawings, which is set forth hereinafter, and thus the invention will easily be carried out by a person skilled in the art to which the invention pertains. Further, in the following description, well-known arts will not be described in detail if it seems that they could obscure the invention in unnecessary detail. Hereinafter, preferred embodiments of the present invention will be described in detail with reference to the accompanying drawings.

Figure 1:
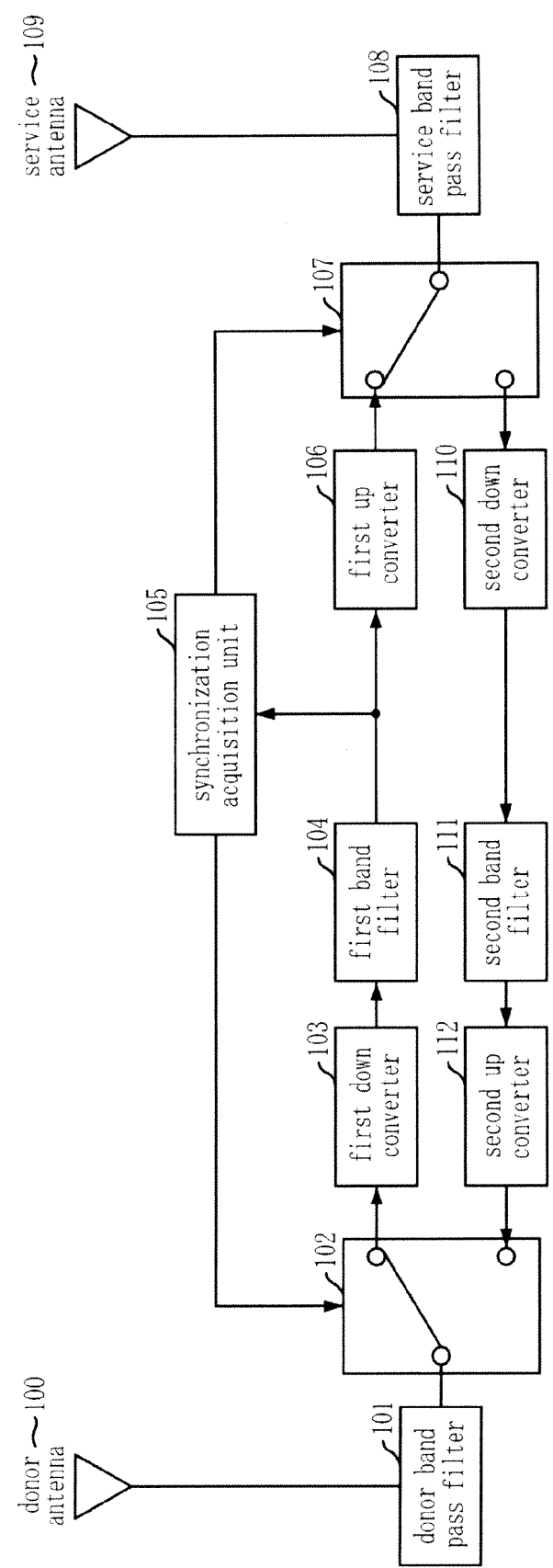
FIG. 1 is a diagram of one example of a conventional TDD radio repeater apparatus.
Figure 2:
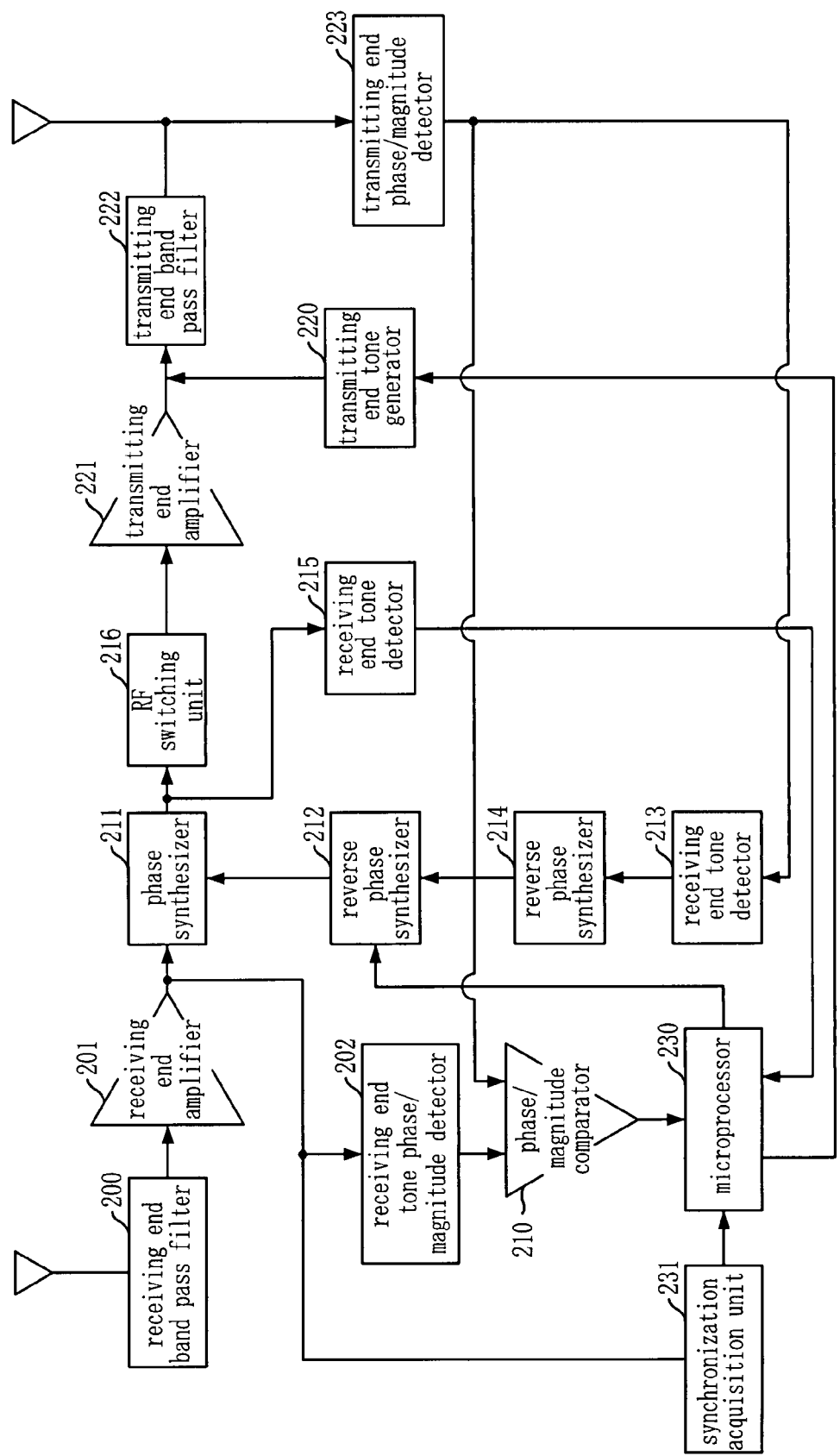
FIG. 2 is a diagram of another example of a conventional radio repeater apparatus.
Figure 3:
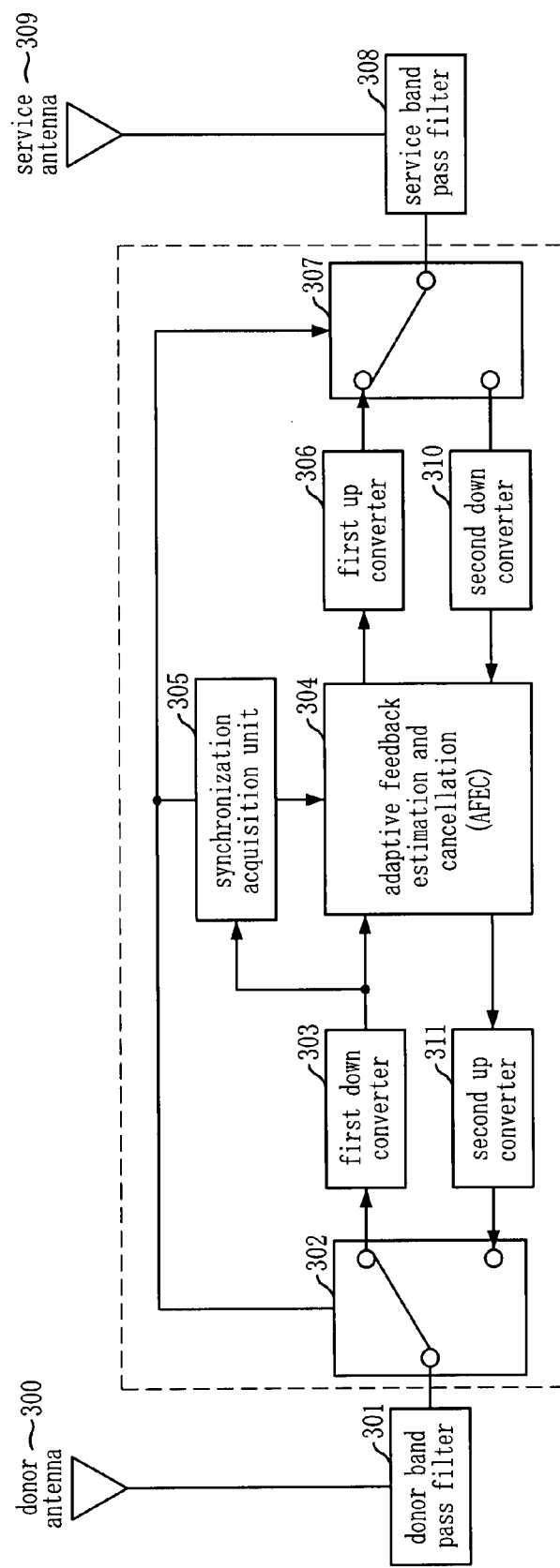
FIG. 3 is a diagram of a TDD radio repeater apparatus in accordance with a preferred embodiment of the present invention.

FIG. 3 is a diagram showing a configuration of a TDD radio repeater apparatus in accordance with a preferred embodiment of the present invention.

As shown in FIG. 3, the TDD radio repeater apparatus of the invention includes a donor antenna 300 for transmitting/receiving a signal (forward/reverse repeater signal) to be repeated to/from a base station; a donor band pass filter 301 for band-filtering the forward/reverse repeater signal transmitted/received through the donor antenna 300; a donor switching unit 302 for switching the forward repeater signal from the donor band pass filter 301 to a first down converter 303 or the reverse repeater signal from a second up converter 311 to the donor band pass filter 301 under the control of a synchronization acquisition unit 305; the first down converter 303 for down-converting the forward repeater signal switched through the donor switching unit 302 into a base band signal; the synchronization acquisition unit 305 for acquiring the synchronization with the base station by using the forward repeater signal down-converted by the first down converter 303; an AFEC apparatus 304 for removing the feedback signal from the forward repeater signal down-converted by the first down converter 303 or the reverse repeater signal down-converted by the second down converter 310 based on information from the synchronization acquisition unit 305, and adjusting the gain of the forward/reverse repeater signal; a first up converter 306 for up-converting the forward repeater signal from the AFEC apparatus 304 back into a repeater signal of high frequency band; a service antenna 309 for transmitting/receiving a signal to be repeated (forward/reverse repeater signal) to/from a terminal of a service area; a service band pass filter 308 for band-filtering the forward/reverse repeater signal transmitted/received through the service antenna 309; a service switching unit 307 for switching the forward repeater signal from the first up converter 306 to the service band pass filter 308 or the reverse repeater signal from the service band pass filter 308 to the second down converter 310 under the control of the synchronization acquisition unit 305; the second down converter 310 for down-converting the reverse repeater signal switched through the service switching unit 307 into a base band signal to transfer it to the AFEC apparatus 304; and a second up converter 311 for up-converting the reverse repeater signal from the AFEC apparatus 304 back into a repeater signal of high frequency band to provide it to the donor switching unit 302.

Here, the AFEC apparatus 304 functions to remove a feedback signal of the signal to be repeated and automatically adjust the gain to control the magnitude of the output signal, together with the synchronization acquisition unit 305. In addition, the AFEC apparatus 304 further performs an automatic delay adjustment function which prevents a mutual interference between the feedback signal and a multipath signal. That is, the AFEC apparatus 304 adjusts the generation delay of the feedback signal so that the feedback signal is generated at the moment when the multipath signal is not received, to thereby remove the feedback signal in the state that the multipath signal and the feedback signal do not overlap with each other. Details of the above will be described with reference to FIG. 4 later.

Further, the AFEC apparatus 304 estimates the feedback signal and radio channel environments around the TDD radio repeater apparatus by using the correlation between a base station's ID acquired by the synchronization acquisition unit 305 and the forward repeater signal. Details thereof will be described with reference to FIG. 4 later.

The synchronization acquisition unit 305 applies a synchronization signal to the AFEC apparatus 304 when the synchronization signal can be stably obtained during more than a predetermined time (for example, more than 3 seconds as time which can be regarded as a same signal intensity over plural frames) under the condition of more than a predetermined signal magnitude (for example, more than about 1/10 of an average input signal magnitude), indicating that the synchronization acquisition is established. Meanwhile, in case where the synchronization acquisition is not made, the synchronization signal is not applied to the AFEC apparatus 304, so that all operations of the TDD radio repeater apparatus are stopped until the synchronization acquisition becomes made. Further, the synchronization acquisition unit 305 controls the ON/OFF switching operation of the up and down links to be normally performed by considering the signal processing time spent by the AFEC apparatus 304 of the TDD radio repeater apparatus and time spent by the filters and other components.

By operating as mentioned above, the TDD radio repeater apparatus can overcome the existing problems such as the output limitation and the constraint in its installment and can save the installment cost as well as exhibit high output characteristics.

In succession, a detailed configuration and operation of the AFEC apparatus 304 will be described in detail with reference to FIG. 4.

Figure 4:
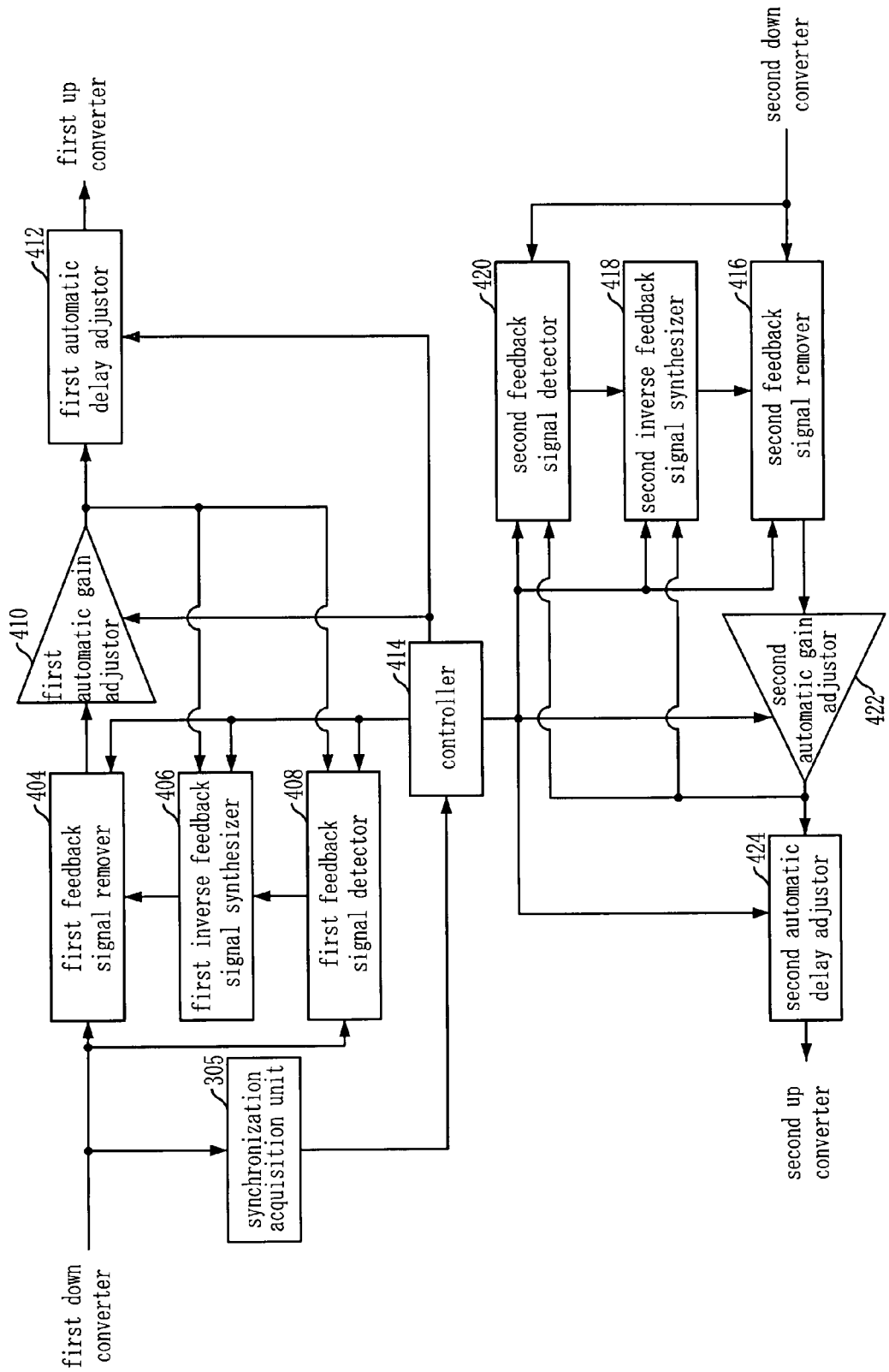
FIG. 4 is a detailed diagram illustrating one example of an AFEC apparatus shown in FIG. 3.

FIG. 4 is a detailed diagram illustrating one example of the AFEC apparatus shown in FIG. 3.

As shown in FIG. 4, the AFEC apparatus 304 of the invention includes a first automatic gain adjustor 410 for automatically adjusting an output signal magnitude of a forward repeater signal to be repeated; a first feedback signal detector 408 for detecting a phase and a magnitude of a residual feedback signal that exists within the forward repeater signal from the forward repeater signal of a base band received from the first automatic gain adjustor 410 and from the forward repeater signal of a base band from the first down converter 303 to update the phase and magnitude of the feedback signal; a first inverse feedback signal synthesizer 406 for creating an inverse feedback signal to be used in removing the feedback signal that exists within the forward repeater signal by using the forward repeater signal from the forward repeater signal of a base band received from the first automatic gain adjustor 410 and the phase and magnitude of the feedback signal from the first feedback signal detector 408; a first feedback signal remover 404 for removing the feedback signal that exists within the forward repeater signal down-converted by the first down converter 303 by using the inverse feedback signal from the first inverse feedback signal synthesizer 406 to provide the first automatic gain adjustor 410 with the signal that the feedback signal is removed; a second automatic gain adjustor 422 for automatically adjusting an output signal magnitude of a reverse repeater signal to be repeated; a second feedback signal detector 420 for detecting a phase and a magnitude of a residual feedback signal that exists within the reverse repeater signal from the reverse repeater signal of a base band received from the second automatic gain adjustor 422 and from the reverse repeater signal of a base band from the second down converter 310 to update the phase and magnitude of the feedback signal; a second inverse feedback signal synthesizer 418 for creating an inverse feedback signal to be used in removing the feedback signal that exists within the reverse repeater signal by using the reverse repeater signal of a base band from the second automatic gain adjustor 422 and the phase and magnitude of the feedback signal from the second feedback signal detector 420; a second feedback signal remover 416 for removing the feedback signal that exists within the reverse repeater signal down-converted by the second down converter 310 based on the inverse feedback signal from the second inverse feedback signal synthesizer 418 to provide the second automatic gain adjustor 422 with the signal that the feedback signal is removed; and a controller 414 for controlling each of the above components to remove the feedback signal that exists within the forward/reverse repeater signal to be repeated and then transmit it.

As mentioned above, since the AFEC apparatus 304 employs the same frequency for each of the up and down links in view of characteristics of the TDD radio repeater apparatus, it can be seen that the radio channel characteristics of the up and down links are identical to each other. The operations of the components in the up and down links are the same, and therefore, a concrete embodiment will be described only for the components of the down link, without a separate description for two types of components.

Here, the synchronization acquisition unit 305 is an essential component which is necessarily needed in the radio repeater apparatus of the TDD method, and extracts a synchronization signal required for precisely controlling a signal flow from the base station to the terminal (forward) or from the terminal to the base station (reverse). This synchronization signal extraction (acquisition) process is to find a signal, i.e., a preamble, arranged at the very beginning of the down link from the base station to the terminal. The preamble is configured to efficiently extract the synchronization signal in the TDD method. In the process of acquiring the synchronization signal, the base station information such as the base station's ID and segment information can be obtained additionally. Like this, when the synchronization acquisition unit 305 acquires the synchronization signal and finds the information on the base station to transfer the same to the controller 414, the controller 414 controls the operation of the radio repeater apparatus of the TDD method by employing the synchronization signal and the base station information provided from the synchronization acquisition unit 305.

Especially, the first feedback signal detector 408 can estimate a feedback signal component based on the base station's ID obtained from the synchronization acquisition unit 305. In other words, since the base station's ID is composed of a pseudo noise code (PN code), the phase and magnitude of the feedback signal can be estimated by calculating the correlation value between the base station's ID and the forward repeater signal. Thus, the first feedback signal detector 408 calculates the correlation value between the base station's ID from the controller 414 and the forward repeater signal from the first down converter 303 and the first automatic gain adjustor 410 to detect the phase and magnitude of the residual feedback signal that exists within the forward repeater signal, and transfers the same to the first inverse feedback signal synthesizer 406.

The first automatic gain adjustor 410 decides a gain value by using the magnitude of the forward repeater signal received from the first feedback signal remover 404, a gain adjustment value given by the current status of the AFEC apparatus 304, and a predetermined target output magnitude value and a target gain value from the controller 414, and automatically adjusts the gain (output signal magnitude) of the forward repeater signal, which the feedback signal is removed in the first feedback signal remover 404, based on the decided gain value. To be more specific, in the automatic gain adjusting process, if the output value is greater than the predetermined target output magnitude value, the first automatic gain adjustor 410 restricts the output magnitude in a manner that the gain is no longer increased. If the output value is less than the predetermined target output magnitude value, the first automatic gain adjustor 410 increases the gain at a preset unit time (e.g., 3 dB/1 sec) until the magnitude of the signal from the first feedback signal remover 404 becomes the target gain value.

Further, the first feedback signal remover 404 removes the feedback signal from the forward repeater signal (containing the feedback signal) transferred from the first down converter 303 based on the inverse feedback signal received from the first inverse feedback signal synthesizer 406, and provides the same to the first automatic gain adjustor 410.

In other words, the first feedback signal remover 404 synthesizes the forward repeater signal from the first down converter 303 and the inverse feedback signal from the first inverse feedback signal synthesizer 406 to remove the feedback signal that exists within the forward repeater signal, and then transfers the forward repeater signal to the first automatic gain adjustor 410.

The inverse feedback signal synthesizer 406 adjusts the magnitude and phase of the signal to be used in removing the feedback signal that exists within the forward repeater signal by using the forward repeater signal of base band, whose gain is automatically adjusted, being received from the first automatic gain adjustor 410, and the phase and magnitude of the feedback signal from the first feedback signal detector 408, to thereby generate the inverse feedback signal.

The controller 414 controls the signal flow from the base station to the terminal, and vice versa, by finding the timings of the up and down links by using the synchronization signal from the synchronization acquisition unit 305, and provides the first feedback signal detector 408 with a code (e.g., base station's ID) required for the feedback signal detection based on the base station information from the synchronization acquisition unit 305. And the synchronization acquisition unit 305 controls the operations of the donor and the service switching units 302 and 307 (see FIG. 3). In response to the synchronization acquisition result from the base station to the terminal by the synchronization acquisition unit 305, the controller 414 controls the operations of the first automatic gain adjustor 410, the first feedback signal detector 408, the first inverse feedback signal synthesizer 406 and the first feedback signal remover 404. For example, if a transmitted signal is contained in a received signal, that is, if the synchronization acquisition unit 305 acquires the synchronization signal and the base station information, the controller 414 normally operates the first automatic gain adjustor 410, the first feedback signal detector 408, the first inverse feedback signal synthesizer 406 and the first feedback signal remover 404. At this time, the target output magnitude value is preset to a specific value and then provided to the first automatic gain adjustor 410. On the other hand, if a transmitted signal is not contained in a received signal, that is, if the synchronization acquisition unit 305 does not acquire the synchronization signal, the controller 414 halts the operations of the first automatic gain adjustor 410, the first feedback signal detector 408, the first inverse feedback signal synthesizer 406 and the first feedback signal remover 404.

Meanwhile, the AFEC apparatus 304 for the wireless repeater apparatus of the invention further includes a first automatic delay adjustor 412 for preventing the mutual interference between the feedback signal and the multipath signal. That is, the first automatic delay adjustor 412 is connected to the first automatic gain adjustor 410 to adjust the generation delay of the feedback signal so that the feedback signal is generated at the moment the multipath signal is not received, and can remove the feedback signal in the state that the multipath signal and the feedback signal do not overlap with each other. To do so, the radio repeater apparatus checks in advance time when the multipath signal is generated, that is, the position of the multipath component. In the up link, a second automatic delay adjustor 424 of the same function is also further provided and connected to the second automatic gain adjustor 422.

Figure 5:
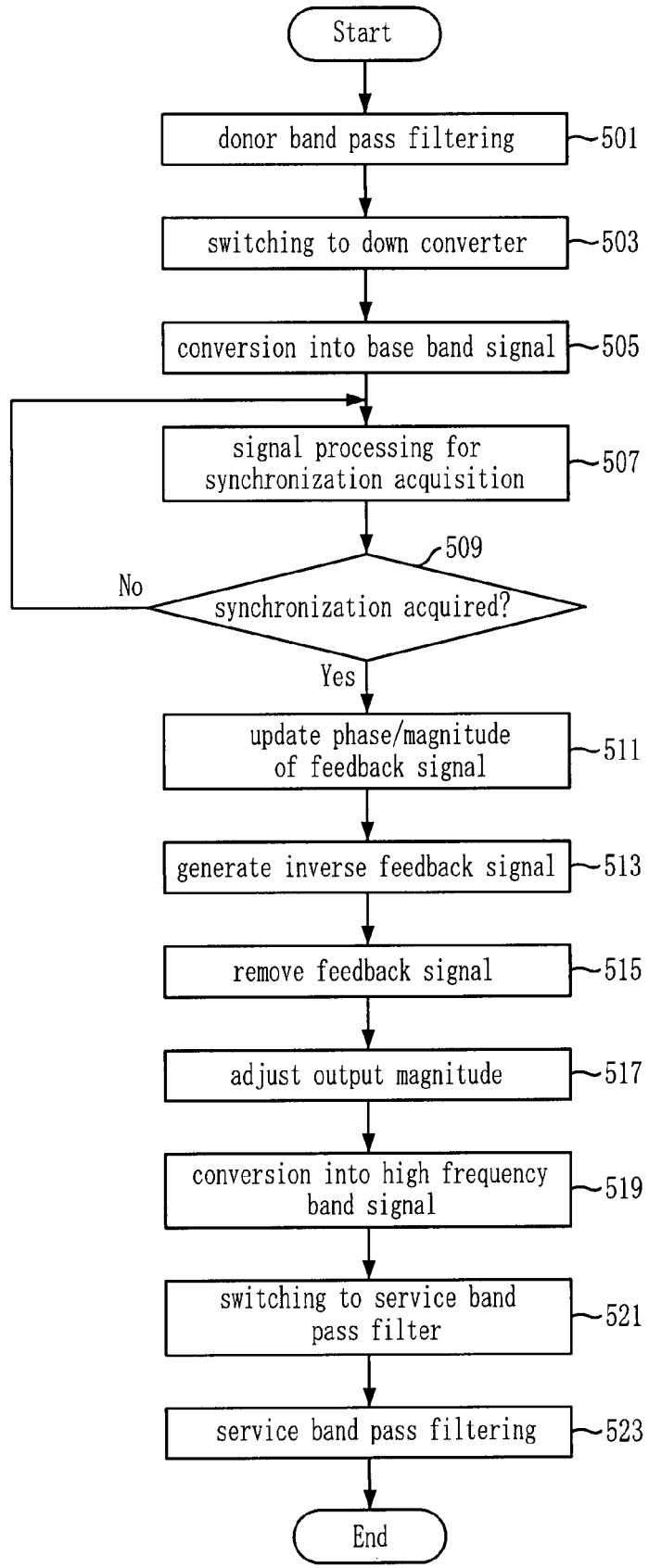
FIG. 5 is a flowchart illustrating an AFEC method and a TDD radio repeater method using the same in accordance with another embodiment of the present invention.

FIG. 5 is a flowchart illustrating an AFEC method and a TDD radio repeater method using the same in accordance with another embodiment of the present invention, especially a method for removing a feedback signal that remains in a subsequent forward repeater signal by using a feedback signal, resulting from repeater of an initial forward signal.

In case of the down link of the TDD radio repeater method, there may exist both a repeater signal transmitted to repeater an actual service from the base station and a feedback signal which is radiated to space through the service antenna 309 and returned again or may exist only a feedback signal including unspecified noises, in a signal received by the AFEC apparatus 304 through the path from the donor antenna 300 to the first down converter 303. The signal transmitted from the base station is represented as the multipath signal by the radio channel environment. If there exists only the feedback signal in the signal received by the radio repeater apparatus, it is the case that the base station does not send a transmitted signal to the mobile communication terminal. This is the same in the up link from the terminal to the base station, and therefore, only the down link will be described here.

First of all, when a signal (forward repeater signal) is received through the donor antenna 300, the donor band pass filter 301 performs donor band pass filtering (501), and the donor switching unit 302 switches the forward repeater signal to the first down converter 303 (503) to deliver it to the first down converter 303. Then, the first down converter 303 down-converts the forward repeater signal of high frequency band into a forward repeater signal of base band (505).

Thereafter, the synchronization acquisition unit 305 acquires a synchronization signal for the down link from the base station to the terminal by using the forward repeater signal of base band, together with information about the base station, and delivers them to the controller 414 of the AFEC apparatus 304 (507).

If it fails to acquire the synchronization signal (509), the above step 507 is repeatedly performed. If the synchronization acquisition of the down link is achieved by the synchronization acquisition unit 305 (509), the controller 414 normally operates the first automatic gain adjustor 410, the first feedback signal detector 408, the first inverse feedback signal synthesizer 406 and the first feedback signal remover 404 so that the first feedback signal detector 408 updates the phase and magnitude of the feedback signal (511). Thus, the first inverse feedback signal synthesizer 406 creates an inverse feedback signal depending on the phase and magnitude of the feedback signal updated by the first feedback signal detector 408 (513). And, the first feedback signal remover 404 synthesizes the forward repeater signal of base band and the inverse feedback signal created by the first inverse feedback synthesizer 406, to thereby remove the feedback signal contained in the forward repeater signal (515).

Like this, after the feedback signal has been removed from the forward repeater signal to be sent, the first automatic gain adjustor 410 automatically adjusts the output magnitude (gain) of the forward repeater signal (517). At this time, the first automatic gain adjustor 410 decides a gain value by using the magnitude of the forward repeater signal received from the first feedback signal remover 404, a gain adjustment value given by the current status of the AFEC apparatus 304, and a predetermined target output magnitude value and a target gain value from the controller 414, and automatically adjusts the gain (output signal magnitude) of the forward repeater signal, which the feedback signal is removed by the first feedback signal remover 404, based on the decided gain value. Namely, the first automatic gain adjustor 410 amplifies or attenuates the magnitude of the forward repeater signal to automatically thereby adjust the magnitude of the output signal.

Next, the first up converter 306 up-converters the gain-adjusted forward repeater signal into a forward repeater signal of high frequency band (519), and the service switching unit 307 switches the up-converted forward repeater signal to the service band pass filter 308 (521), which performs service band pass filtering (523) to be outputted through the service antenna 309.

Among the above steps, the step (511) of updating the phase and magnitude of the feedback signal will be described in more detail below. The first feedback signal detector 408 estimates the phase and magnitude of the feedback signal by using the correlation between the forward repeater signal of base band received from the first down converter 303 and the base station information (e.g., base station's ID) which is acquired by the synchronization acquisition unit 305 and provided through the controller 414.

Meanwhile, it is preferable that the controller 414 controls the operation allowing the feedback signal to be received at the time there exists no multipath signal. This is to make it possible that the feedback signal is received at the moment when the multipath signal is weak or not received because it is difficult to predict accurate radio channel characteristics if the multipath signal and the feedback signal overlapping with each other are again received, and to thus precisely remove the feedback signal.

Now, other embodiments of the present invention will be described with reference to FIGS. 6 and 7. Here, the description for the parts having the same technical gist as that of the aforementioned embodiments is omitted and only parts having different technical gist will be described in detail.

Figure 6:
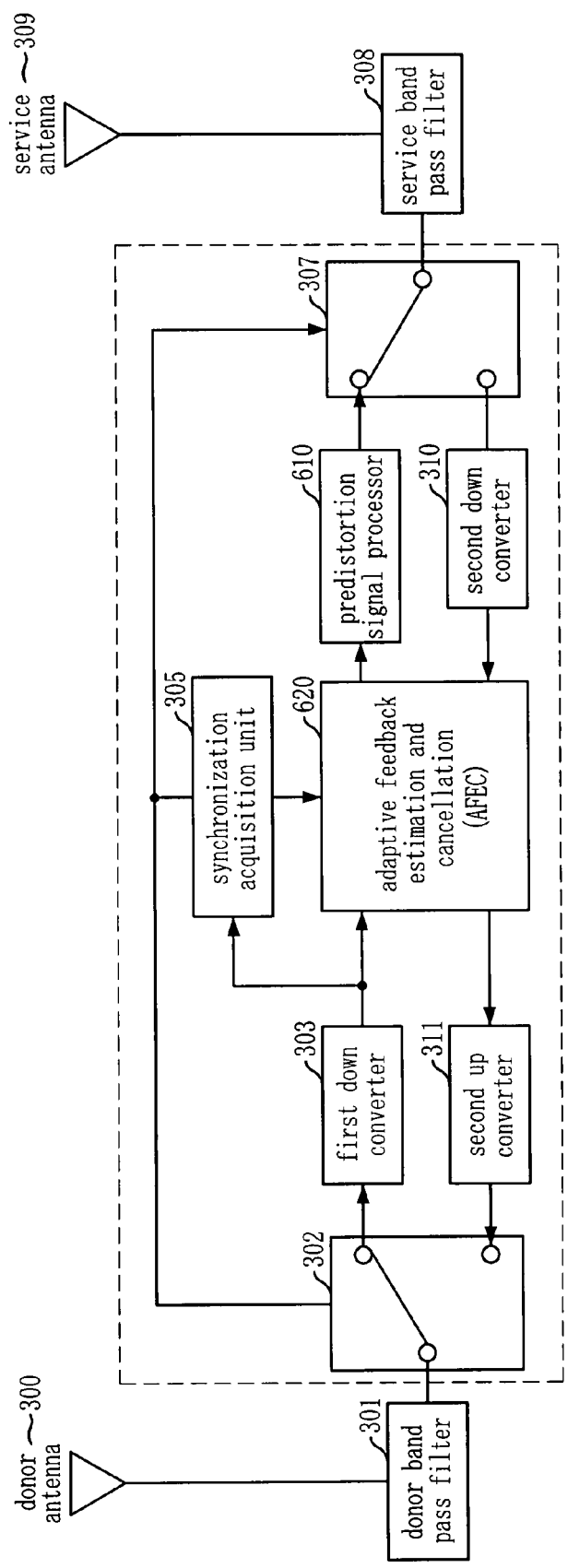
FIG. 6 is a diagram illustrating a TDD radio repeater apparatus in accordance with another embodiment of the present invention.

FIG. 6 is a diagram illustrating a configuration of a TDD radio repeater apparatus in accordance with another embodiment of the present invention.

As shown in FIG. 6, a predistortion signal processor 610 linearly power-amplifies a forward repeater signal from an AFEC apparatus 620 based on predistortion information in linkage with the AFEC apparatus 620, and then transfers it to the service switching unit 307.

In other words, the predistortion signal processor 610 up-converts the forward repeater signal from the AFEC apparatus 620, and thereafter, linearly amplifies its power depending on the predistortion information from the AFEC apparatus 620, and provides the same to the service switching unit 307. Further, it measures the power-amplified forward repeater signal and transfers control information for deciding an amount of an interference signal to the AFEC apparatus 620 to be utilized as the predistortion information.

Based on this, the AFEC apparatus 620 controls the liner power amplification of the forward repeater signal based on the predistortion information in linkage with the predistortion signal processor 610.

That is to say, the AFEC apparatus 620 decides an amplification output depending on the control information (e.g., including linearity of an output of a power amplifier and signal magnitude) for deciding the amount of the interference signal received from the predistortion signal processor 610, and controls the linear power amplification of the forward repeater signal by the predistortion signal processor 610 by using the decision result as the predistortion information.

At this time, the reason of performing the predistortion signal processing function only for the forward repeater signal is because the larger the forward repeater signal is amplified in power so that the forward repeater signal to the terminal end is radiated to a greater distance, the more the power of interference signal is strong. Of course, the predistortion signal processing function may also be performed for the reverse repeater signal if there is an effect compared with costs.

FIG. 7 is a detailed diagram illustrating a configuration of one example of the AFEC apparatus and the predistortion signal processor shown in FIG. 6.

As shown in FIG. 7, the predistortion signal processor 610 includes an RF converter 611 for up-converting the forward repeater signal from the AFEC apparatus 620 into a signal (RF) of high frequency band, a power amplifier 612 for linearly power-amplifying the forward repeater signal from the RF converter 611 depending on the predistortion information from the AFEC apparatus 620, and a signal converter 613 for measuring the forward repeater signal power-amplified by the power amplifier 612, and transferring control information for deciding an amount of an interference signal to the AFEC apparatus 620 to be utilized as the predistortion information.

At this time, the predistortion signal processor 610 may further include a band pass filter (not shown) for filtering the forward repeater signal power-amplified by the power amplifier 612 for transferring to the service switching unit 307.

Here, the signal converter 613 measures the output signal of the forward repeater signal power-amplified by the power amplifier 612 and provides the control information (e.g., including linearity of the output of the power amplifier and signal magnitude) for deciding the amount of the interference signal to the controller 621 of the AFEC apparatus 620, to be utilized in removing the interference and as the predistortion information in one controller, including generating a control signal to decide a correction amount to correct the linearity of the amplified signal and correcting the signal magnitude of the amplified signal to prevent an abnormal state such as oscillation of the interference signal.

At this time, the signal converter 613, after measuring (e.g., signal magnitude and linearity) the output signal of the forward repeater signal power-amplified by the power amplifier 612, converts the output signal into a base band signal of a digital form, and transfers it to the controller 621 of the AFEC apparatus 620.

Then, the controller 621 of the AFEC apparatus 620 decides an amplification output of the power amplifier 612 depending on the control information (e.g., including linearity of the output of the power amplifier and signal magnitude), for deciding the amount of the interference signal, transmitted from the signal converter 613 of the predistortion signal processor 610, and controls the linear power amplification of the forward repeater signal in the power amplifier 612 by using the decision result as the predistortion distortion information.

In other words, the controller 621 controls the predistortion signal processing function to correct the nonlinearity of the power amplifier 612, thereby making the nonlinearity property of the power amplifier 612 linearized.

At this time, the linear power amplification control method for performing the linearity correction of the amplified signal of the forward repeater signal and the signal magnitude correction of the amplified signal will be described in more detail through some examples as follows.

Firstly, in the linearity correction, if the output value is greater than a predetermined target output magnitude value (e.g., a value compared with a slope rather than an output value at a previous time), the controller 621 of the AFEC apparatus restricts the output magnitude in a manner that the gain is no longer increased to thereby secure the linearity. If the output value is less than the predetermined target output magnitude value, the controller 621 of the AFEC apparatus increases the gain at a preset unit time (e.g., 3 dB/1 sec) until the magnitude of an input signal becomes a target gain value.

Secondly, in the signal magnitude correction of the amplified signal, if the output value is greater than a predetermined target output magnitude value (e.g., a device rated output specification range value as an absolute output value set by the device), the controller 621 of the AFEC apparatus abruptly decreases the gain at a preset unit time (e.g., 3 dB/1 sec) until the magnitude of an input signal becomes less than a target gain value, to thereby prevent oscillation.

The method of the present invention as mentioned above may be implemented by a software program that is stored in a computer-readable storage medium such as CD-ROM, RAM, ROM, floppy disk, hard disk, optical magnetic disk, or the like. This process may be readily carried out by those skilled in the art; and therefore, details of thereof are omitted here.

While the present invention has been described with respect to the particular embodiments, it will be apparent to those skilled in the art that various changes and modifications may be made without departing from the spirit and scope of the invention as defined in the following claim.

What is claimed is:

1. An adaptive feedback estimation and cancellation (AFEC) apparatus for repeating between a base station and a terminal, the apparatus comprising:

a controller for generating and outputting control information by using a synchronization signal from an external synchronization acquisition unit and base station information, in order to remove a feedback signal that exists in a forward/reverse repeater signal to be repeated and then send the forward/reverse repeater signal;

a first feedback prediction canceller for adaptively removing a feedback signal that exists in the forward repeater signal based on the control information from the controller and automatically adjusting the gain of the forward repeater signal;

a second feedback prediction canceller for adaptively removing a feedback signal that exists in the reverse repeater signal based on the control information from the controller and automatically controlling the gain of the reverse repeater signal;

a first automatic delay adjustor for preventing mutual interference between the feedback signal that exists within the forward repeater signal and a multipath signal under the control of the controller;

a second automatic delay adjustor for preventing mutual interference between the feedback signal that exists within the reverse repeater signal and the multipath signal under the control of the controller, wherein, the first automatic delay adjustor and the second automatic delay adjustor adjust the generation delay of the feedback signal so that the feedback signal is generated at the moment when the multipath signal is not received.

2. The apparatus of claim 1, wherein the first and the second automatic delay adjusters are connected to the corresponding first and second feedback prediction cancellers, respectively, so that the feedback signal is generated at the moment when the multipath signal is not received, and adjust the generation delay of the feedback signal by the control of the controller to thereby remove the feedback signal in the state that the multipath signal and the feedback signal do not overlap with each other.

3. The apparatus of claim 1, wherein the controller further performs the function of controlling a predistortion signal process to correct the nonlinearity of an external power amplifier.

4. The apparatus of claim 3, wherein the controller decides an amplification output of the power amplifier depending on the control information for deciding an amount of an interference signal transferred from an external predistortion signal processor, and controls a linear power amplification of the forward repeater signal by the power amplifier by using the decided amplification output as predistortion information.

5. The apparatus of claim 1, wherein the first feedback prediction canceller includes:
a first automatic gain adjustor for automatically adjusting the gain of the forward repeater signal under the control of the controller;
a first feedback signal detector for detecting and updating a phase and a magnitude of the feedback signal from the forward repeater signal provided from the first automatic gain adjustor and an external first down converter under the control of the controller;
a first inverse feedback signal synthesizer for creating an inverse feedback signal by using the forward repeater signal from the first automatic gain adjustor and the phase and magnitude of the feedback signal from the first feedback signal detector under the control of the controller; and
a first feedback signal remover for removing the feedback signal that exists within the forward repeater signal from the first down converter by using the inverse feedback signal from the first inverse feedback signal synthesizer under the control of the controller, to provide the signal that the feedback signal is removed to the first automatic gain adjustor, and
the second feedback prediction canceller includes:
a second automatic gain adjustor for automatically adjusting the gain of the reverse repeater signal under the control of the controller;
a second feedback signal detector for detecting and updating a phase and a magnitude of the feedback signal from the reverse repeater signal provided from the second automatic gain adjustor and an external second down converter under the control of the controller;
a second inverse feedback signal synthesizer for creating an inverse feedback signal by using the reverse repeater signal from the second automatic gain adjustor and the phase and magnitude of the feedback signal from the second feedback signal detector under the control of the controller; and
a second feedback signal remover for removing the feedback signal that exists within the reverse repeater signal from the second down converter by using the inverse feedback signal from the second inverse feedback signal synthesizer under the control of the controller, to provide the signal that the feedback signal is removed to the second automatic gain adjustor.

6. The apparatus of claim 5, wherein the first feedback signal detector calculates a correlation value between a base station's identification (ID) from the controller and the forward repeater signal from the first down converter and the first automatic gain adjustor, and detects a phase and a magnitude of a residual feedback signal that exists within the forward repeater signal to transfer them to the first inverse feedback signal synthesizer.

7. The apparatus of claim 5, wherein the controller controls the flow of the forward/reverse repeater signal by finding timings of up and down links using the synchronization signal from the synchronization acquisition unit, transfers the base station ID that is necessary for detecting the feedback signal by using base station information from the synchronization acquisition unit to the first feedback signal detector, and controls the operations of the first automatic gain adjustor, the first feedback signal detector, the first inverse feedback signal synthesizer and the first feedback signal remover based on the forward synchronization acquisition result in the synchronization acquisition.

8. The apparatus of claim 7, wherein the first automatic gain adjustor decides a gain value by using the magnitude of the forward repeater signal from the first feedback signal remover, a gain adjustment value given by the current status of the AFEC apparatus, and a predetermined target output magnitude value and a target gain value from the controller, and automatically adjusts the gain (output signal magnitude) of the forward repeater signal, which the feedback signal is removed by the first feedback signal remover, based on the decided gain value.

9. A time division duplex (TDD) radio repeater apparatus comprising:
a donor antenna for transmitting/receiving a signal (forward/reverse repeater signal) to be repeated to/from a base station;
a first filtering unit for band-filtering the forward/reverse repeater signal transmitted/received via the donor antenna;
a donor switching unit for switching the forward repeater signal from the first filtering unit to a first down converter or switching the reverse repeater signal from a second up converter to the first filtering unit under the control of a synchronization acquisition unit;
the first down converter for down-converting the forward repeater signal switched through the donor switching unit into a base band signal;
the synchronization acquisition unit for acquiring synchronization with the base station by using the forward repeater signal down-converted by the first down converter;
an AFEC apparatus for removing a feedback signal from the forward repeater signal down-converted by the first down converter or from the reverse repeater signal down-converted by a second down converter and adjusting the gain of the forward/reverse repeater signal based on information from the synchronization acquisition unit;
a first up converter for up-converting the forward repeater signal from the AFEC apparatus into a repeater signal of high frequency band;
a service antenna for transmitting/receiving a signal (forward/reverse repeater signal) to be repeated to/from a terminal of a service area;
a second filtering unit for band-filtering the forward/reverse repeater signal transmitted/received via the service antenna;
a service switching unit for switching the forward repeater signal from the first up converter to the second filtering unit or switching the reverse repeater signal from the second filtering unit to the second down converter under the control of the synchronization acquisition unit;
the second down converter for down-converting the reverse repeater signal switched through the service switching unit into a base band signal, and transferring the down-converted signal to the AFEC apparatus; and the second up converter for up-converting the reverse repeater signal from the AFEC apparatus into a repeater signal of high frequency band, and transferring the up-converted repeater signal to the donor switching unit.

10. A TDD radio repeater apparatus, the apparatus comprising:

a donor antenna for transmitting/receiving a signal (forward/reverse repeater signal) to be repeated to/from a base station;

a first filtering unit for band-filtering the forward/reverse repeater signal transmitted/received via the donor antenna;

a donor switching unit for switching the forward repeater signal from the first filtering unit to a first down converter or switching the reverse repeater signal from a second up converter to the first filtering unit under the control of a synchronization acquisition unit;

the first down converter for down-converting the forward repeater signal switched through the donor switching unit into a base band signal;

the synchronization acquisition unit for acquiring synchronization with the base station by using the forward repeater signal down-converted by the first down converter;

an AFEC apparatus for removing a feedback signal from the forward repeater signal down-converted by the first down converter or the reverse repeater signal down-converted by a second down converter and adjusting the gain of the forward/reverse repeater signal based on information from the synchronization acquisition unit, and controlling a linear power amplification of the forward repeater signal by using predistortion information in linkage with a predistortion signal processor;

the predistortion signal processor linked with the AFEC apparatus and linearly power-amplifying the forward repeater signal from the AFEC apparatus based on the predistortion information power;

a service antenna for transmitting/receiving a signal (forward/reverse repeater signal) to be repeated to/from a terminal of a service area;

a second filtering unit for band-filtering the forward/reverse repeater signal transmitted/received via the service antenna;

a service switching unit for switching the forward repeater signal from the predistortion signal processor to the second filtering unit or switching the reverse repeater signal from the second filtering unit to the second down converter under the control of the synchronization acquisition unit;

the second down converter for down-converting the reverse repeater signal switched through the service switching unit into a base band signal, and transferring the down-converted signal to the AFEC apparatus; and the second up converter for up-converting the reverse repeater signal from the AFEC apparatus into a repeater signal of high frequency band, and transferring the up-converted repeater signal to the donor switching unit.

11. The apparatus of claim 10, wherein the predistortion signal processor includes:

an RF converter for up-converting the forward repeater signal from the AFEC apparatus into a high frequency band signal;

a power amplifier for linearly power-amplifying the forward repeater signal from the RF converter depending on the predistortion information from the AFEC apparatus; and a signal converter for measuring the forward repeater signal power-amplified by the power amplifier, and transferring control information to decide an amount of an interference signal to the AFEC apparatus to be utilized as the predistortion information.

12. The apparatus of claim 11, wherein the predistortion signal processor further includes: a band pass filtering unit for filtering the forward repeater signal power-amplified by the power amplifier and transferring the filtered signal to the service switching unit.

13. The apparatus of claim 11, wherein the AFEC apparatus decides an amplification output of the power amplifier depending on the control information, for deciding the amount of the interference signal, transferred from the predistortion signal processor, and controls a linear power amplification of the forward repeater signal by the predistortion signal processor by using the decided amplification output as the predistortion on information.

14. The apparatus of claim 9, wherein the AFEC apparatus further performs:

a first automatic delay adjusting function of preventing a mutual interference between the feedback signal existing within the forward repeater signal and a mutipath signal; and a second automatic delay adjusting function of preventing a mutual interference between the feedback signal existing within the reverse repeater signal and the mutipath signal.

15. The apparatus of claim 14, wherein the AFEC apparatus calculates a correlation value between a base station's ID and the repeater signal to be repeated and another repeater signal that its gain is adjusted and feedbacked, and detects a phase and a magnitude of a residual feedback signal that exists within the repeater signal.

16. An AFEC method for repeating between base station and terminal, comprising the steps of:

detecting a phase and magnitude of a feedback signal from a repeater signal to be repeated and another repeater signal that its gain is adjusted and feedbacked by using base station information;

creating an inverse feedback signal by using another repeater signal that its gain is adjusted and feedbacked, and the phase and magnitude of the feedback signal detected in the feedback signal detecting step;

removing the feedback signal that exists in the repeater signal based on the inverse feedback signal created in the inverse feedback signal creating step;

automatically adjusting the gain of the repeater signal that the feedback signal is removed in the feedback signal removing step; and adjusting the generation time of the feedback signal to prevent mutual interference between the feedback signal that exists within the repeater signal and a multipath signal wherein the multipath signal has the same frequency and a different phase as a general multipath signal.

17. The method of claim 16, further comprising the step of controlling a linear power amplification of a forward repeater signal by using predistortion information.

18. The method of claim 16, wherein the detecting step calculates a correlation value between a base station's ID and the repeater signal to be repeated and another repeater signal that its gain is adjusted and feedbacked, and detects and updates a phase and a magnitude of a residual feedback signal that exists within the repeater signal.

19. The method of claim 18, wherein the automatic gain adjusting step decides a gain value by using the magnitude of the repeater signal that the feedback signal is removed in the feedback signal removing step, a gain adjustment value made by the current status of the radio repeater apparatus, and a predetermined target output magnitude value and a target gain value, and automatically adjusts the gain (output signal magnitude) of the repeater signal that the feedback signal is removed in the feedback signal removing step based on the decided gain value.

* * * * *